May 20, 1958

S. W. LONG 2,835,363

OVERRUNNING CLUTCH

Filed Nov. 15, 1952

SPENCER W. LONG
INVENTOR.

BY *Lyon & Lyon*

ATTORNEYS

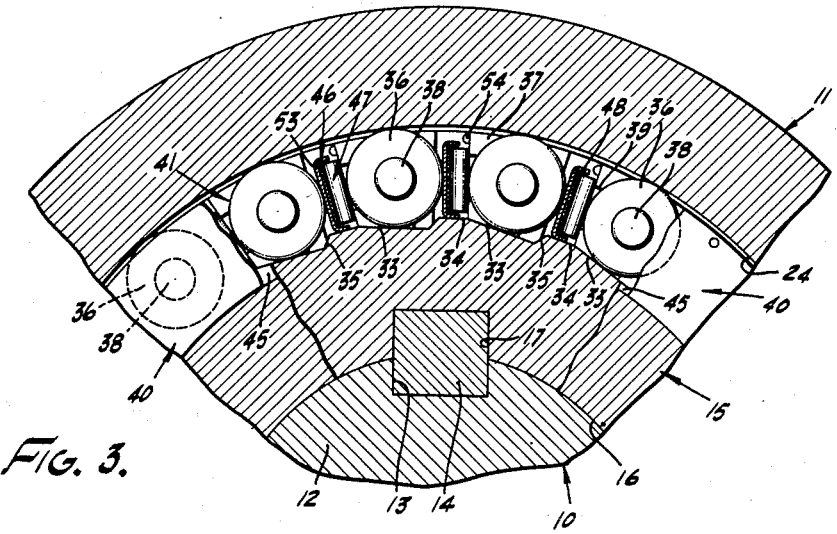
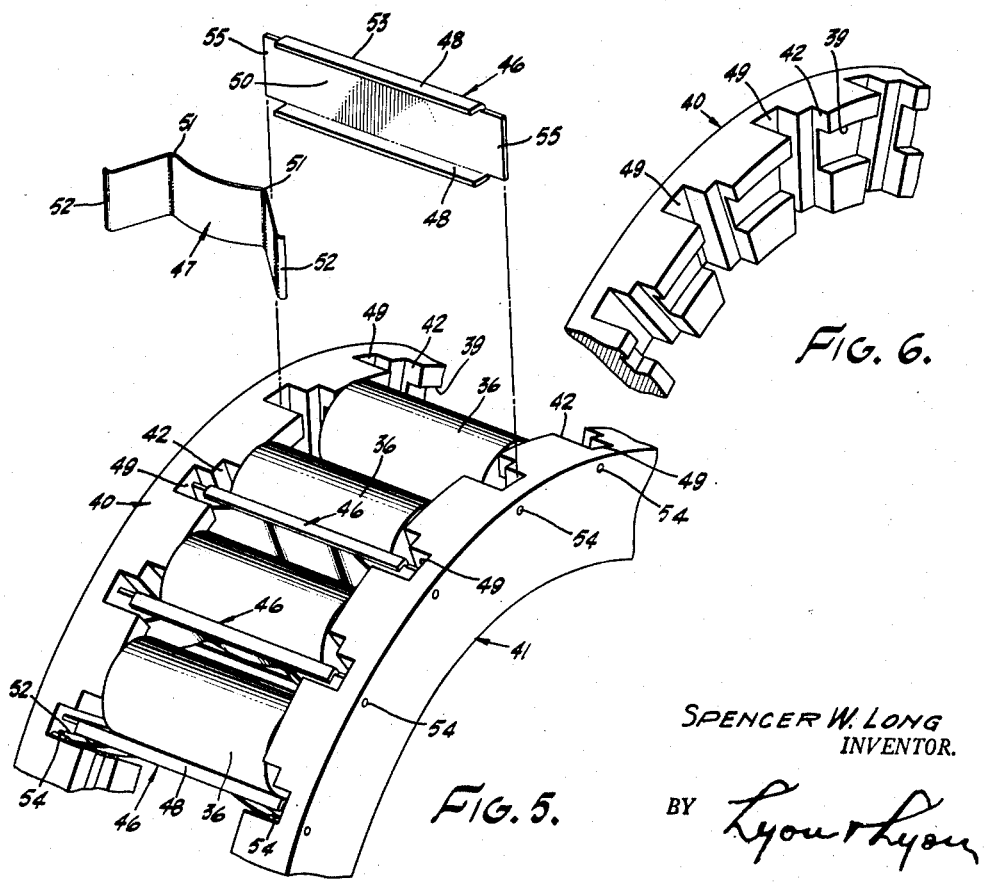

May 20, 1958  S. W. LONG  2,835,363
OVERRUNNING CLUTCH
Filed Nov. 15, 1952  3 Sheets-Sheet 3

SPENCER W. LONG
INVENTOR.

BY *Lyon & Lyon*
ATTORNEYS

United States Patent Office 2,835,363
Patented May 20, 1958

2,835,363

OVERRUNNING CLUTCH

Spencer W. Long, Inglewood, Calif., assignor to The National Supply Company, Pittsburgh, Pa., a corporation of Pennsylvania Application November 15, 1952, Serial No. 320,683

5 Claims. (Cl. 192—45)

My invention relates to the general field of mechanical transmission and is particularly directed to improvements in an overrunning clutch.

The principal object of this invention is to provide a novel form of heavy duty, high capacity overrunning clutch for transmitting power between axially aligned relatively rotatable members.

Another object of my invention is to provide a device of this type having a series of drive rollers positioned in an annulus between the members together with means for moving each of the rollers toward driving position. Another object is to provide a device of this type having a novel form of spring and shoe assembly radially insertable into operative position adjacent each of the drive rollers.

Another object is to provide a device of this type in which spring means for moving each roller are provided and wherein such spring means occupy a minimum space between rollers so that a relatively large number of rollers can be employed.

Other and more detailed objects and advantages will appear hereinafter.

In the drawings:

Figure 3 is a transverse sectional detail taken substantially on the lines 3—3 as shown in Figure 2.

Figure 5 is an exploded perspective view showing the manner of assembly of the drive rollers, shoes and springs.

Figure 6 is a perspective view of a portion of the roller retainer ring shown in Figure 4.

Figure 1:
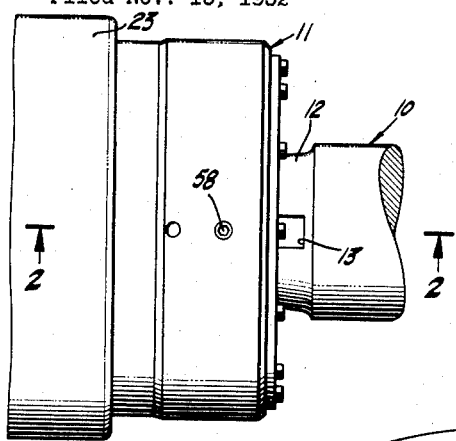
Figure 1 is a plan view showing the outline of an overrunning clutch embodying my invention.

Referring to the drawings:

The members 10 and 11 are mounted for rotation about a common axis. While either may be the driving or driven member, for convenience the shaft 10 will be referred to as the driven member and the housing 11 referred to as the driving member. The shaft 10 is provided with a tapered end portion 12 having one or more keyways 13 formed therein. A key 14 is mounted in each of the keyways 13. A hub member 15 is provided with a central tapered bore 16 to receive the tapered shaft end 12 and is also provided with one or more keyways 17 to receive the keys 14. An end plate 18 is fixed to the shaft 10 by means of threaded fastening elements 19 and this end plate extends into a counterbore 20 provided on the hub member 15. The hub member 15 is thus fixed to turn with the shaft 10.

The housing member 11 is provided with a series of external spline teeth 21 for engagement with a series of internal spline teeth 22 provided on a driving ring 23. The driving ring 23 may be axially shiftable into driving position on an externally splined power driven member, not shown. The housing member 11 is provided with a central cylindrical bore 24 which extends axially for the full length of the housing member 11. The bore 24 may be slightly flared at each end as shown at 25 to facilitate installation of the bearing support sleeves 26 and 27. Each of these sleeves is fixed to the housing member 11 by means of threaded fastenings 28. Projecting portions 29 on the bearing support sleeves fit within the bore 24 and are provided with O rings 30 which prevent leakage of lubricant between said sleeves and the housing member 11. An anti friction bearing assembly 31 is carried by each of the sleeves 26 and 27 and these bearing assemblies are mounted on the hub member 15. Suitable oil seals 32 are provided to prevent leakage of lubricant between the bearing support sleeves and the hub member 15. From this description it will be understood that the housing member 11 is rotatably supported on the hub member 15 and receives driving torque through the interengaging spline teeth 21 and 22.

As best shown in Figure 3, the hub member 15 is provided with a series of inclined surfaces 33 on its outer periphery. Each of these inclined surfaces 33 extends from an arcuate surface 34 at one end to a shoulder 35 at the other end. A series of drive rollers 36 is positioned within the annular space 37 between the housing member 11 and the hub member 15. Each of these drive rollers 36 is cylindrical in shape and is positioned to contact the cylindrical bore 24 in the housing member 11 and to contact one of the inclined surfaces 33 on the hub member 15.

Figure 4:
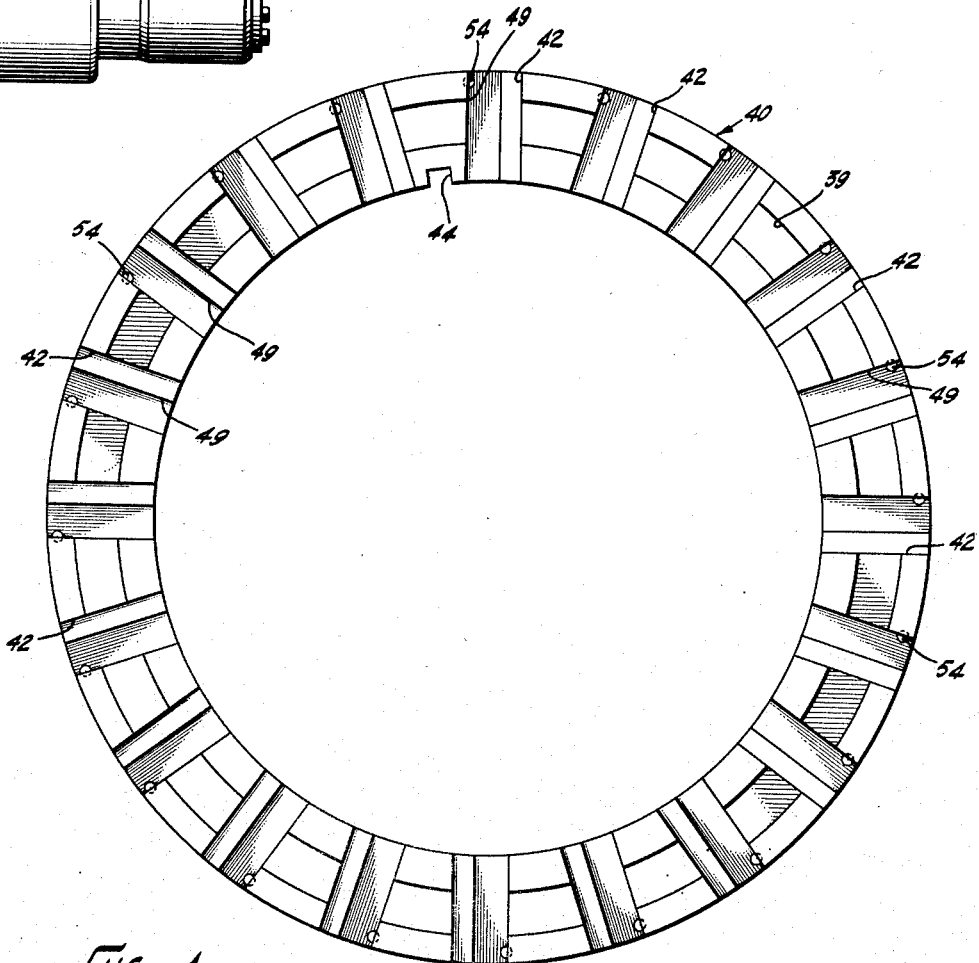
Figure 4 is a front elevation of one of the roller retainer rings.
Figure 2:
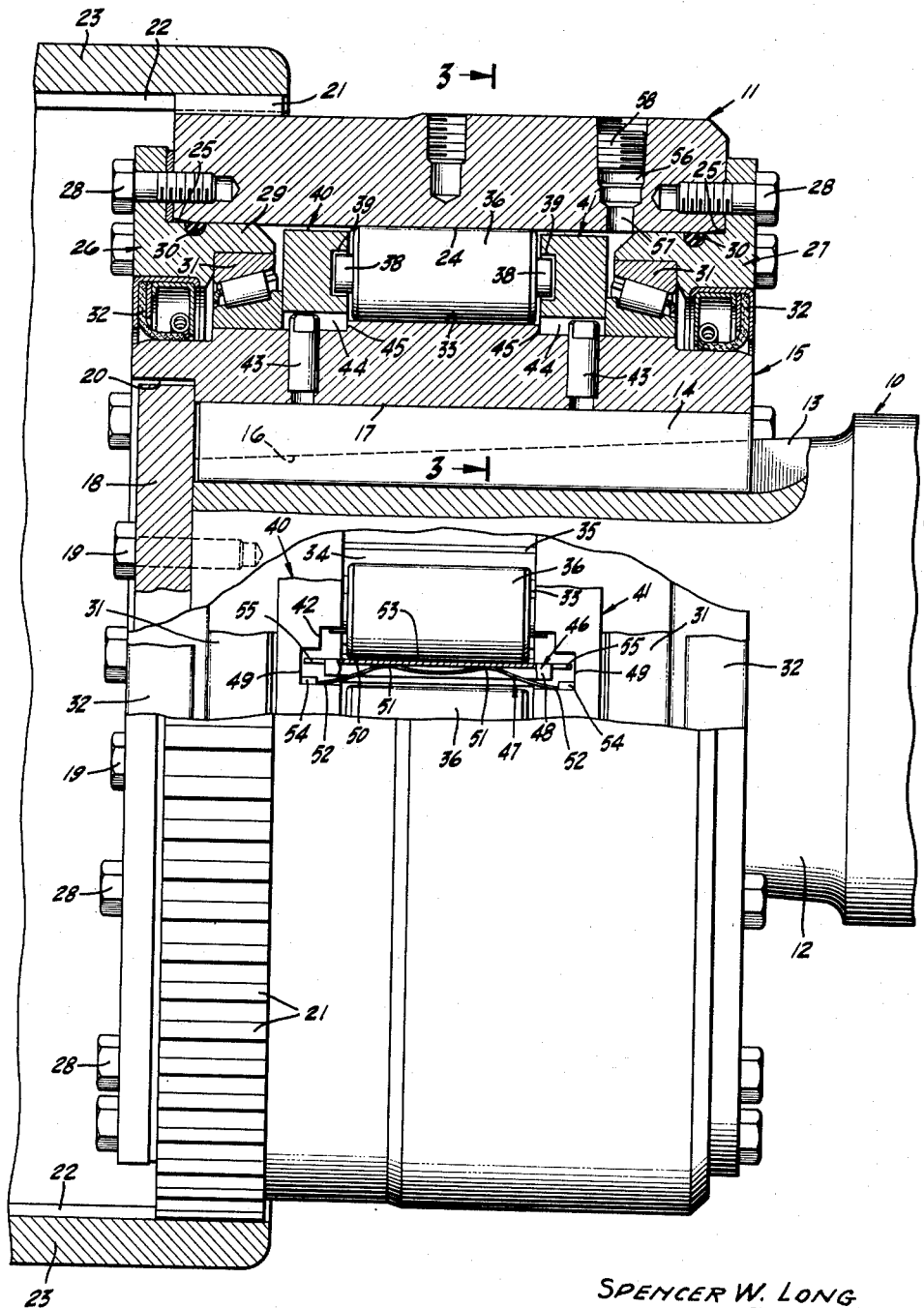
Figure 2 is a side elevation partly broken away and partly in section taken on the line 2—2 as shown in Figure 1.

Each of the drive rollers 36 is provided with integral trunnions 38 extending from the opposed ends thereof. Each trunnion 38 is received within an annular groove 39 provided in one of the roller retainer rings 40 and 41. These roller retainer rings are substantially duplicates except that one is right-handed and the other is left-handed. As shown best in Figures 4 and 6, the roller retainer ring 40 is provided with a series of radially extending slots 42 which intersect the annular groove 39. These slots 42 are sufficiently wide to permit radial passage of the trunnions 38 on the drive rollers 36. The slots 42 on each of the roller retainer rings 40 and 41 are positioned in axial alignment so that, in the absence of the housing member 11, the drive rollers 36 may be installed by radial movement, with the trunnions 38 extending into aligned slots 42. The drive roller 36 may then be moved circumferentially along the groove 39 toward operative position. The roller retainer rings 40 and 41 are mounted on the hub member 15 and are prevented from turning with respect thereto by means of pins 43, which engage in keyways 44 provided in each retainer ring. The retainer rings are each engaged on one side by one of the anti friction bearing assemblies 31 and on the other side by a shoulder 45 on the hub member 15. These shoulders 45 define the extreme end of the inclined surfaces 33.

Means are provided for resiliently urging each of the drive rollers 36 to move circumferentially along its respective inclined surface 33. The means act in a direction to move the roller radially outwardly as it travels along its surface 33. As shown in the drawings, this means includes a shoe 46 for each of the rollers 36 together with a leaf spring 47 for each of the shoes 46. Each shoe 46 may be formed of bronze strip and provided with stiffening flanges 48 extending along the edges thereof. The leaf springs 47 are preferably formed of spring steel and are narrow enough to be received between the opposed flanges 48 of the shoes 46. Each shoe 46 and its respective leaf spring 47 are insertable as a unit radially into opposed recesses 49 provided in the roller retainer rings 40 and 41. The shape of each spring 47 is preferably such that it engages the back surface 50 of its shoe at two spaced locations 51. The ends 52 of each leaf spring engage one wall of the recesses 49. The forward face 53 of each shoe 46 engages a drive roller along a line element thereof. From this description it will be understood that each drive roller 36 is provided with an individual shoe 46 and spring 47 for moving it circumferentially along its respective inclined surface 33. Means are provided for holding each shoe and spring assembly against radial movement under the action of centrifugal force. As shown in the drawings this means comprises a series of small pins 54 which extend axially through each of the roller retainer rings 40 and 41 and each project into each recess 49. The ends 52 of each leaf spring 47 underlie the projecting ends of these pins 54 and hence the springs 47 are restrained from moving radially outwardly in the recesses 49. Moreover the flanges 48 on each shoe 46 receive the central portion of each leaf spring 47 therebetween and hence the shoes 46 are restrained from radial movement outwardly in the recesses 49. It will be observed that the ends 55 of the shoes 46 do not engage the walls of the recesses 49.

Drive rollers 36, shoes 46 and springs 47 are initially assembled in position between the retainer rings 40 and 41 after the retainer rings are mounted on the hub member 15 but before the housing 11 is in position. Each roller is moved radially inwardly with its trunnions 38, through the clearance slots 42. When the trunnions are aligned with the annular grooves 39, the roller 36 is moved circumferentially along its inclined surface 33, the trunnions 38 entering the grooves 39. A unitary assembly comprising a shoe 46, and a leaf spring 47, is then installed in position behind each roller 36. This is accomplished by placing the spring 47 between the flanges 48 of the shoe 46 and moving the assembly as a unit radially inwardly into the recesses 49 behind the roller 36. The ends 52 of the spring 47 are sprung sufficiently to permit them to pass the pins 54 and to reach the position shown in Figure 3. Each drive roller 36 and its associated shoe and spring are sequentially installed in this manner. It will be observed that the drive rollers 36 cannot fall out during this assembly operation after they are once installed because the trunnions 38 are positioned within the annular groove 39 in the retainer rings 40 and 41. After the rollers 36, shoes 46 and springs 47 are all in position the assembly may be moved into position within the housing member 11.

The spring and shoe assembly described above occupies a minimum of space in the circumferential direction and hence a larger number of rollers 36 may be employed. This is an advantageous feature for it distributes the load among a greater number of rollers and contact points on the members 11 and 15 and thus serves to decrease contact stresses and to minimize wear. Suitable means may be provided for introducing lubricant into the annular space 37 and the anti friction bearings 31. Shown in the drawings, this means includes a threaded opening 56 which communicates with the bore 24 through port 57. This opening 56 is normally closed by a plug 58.

In operation, the shaft 10 is driven whenever the housing member 11 turns in a counter-clockwise direction as viewed in Figure 3. In this event, the rollers 36 each move along their respective inclined surface 33 in a direction to bind against the cylindrical bore 24. Whenever the housing 11 rotates in a clockwise direction with reference to the shaft 10, as shown in Figure 3, the rollers 36 are each freed from driving contact with the cylindrical bore 24 and their respective inclined surface 33.

Having fully described my invention, it is to be understood that I do not wish to be limited to the details herein set forth, but my invention is of the full scope of the appended claims.

I claim:

1. In an overrunning clutch assembly, the combination of: a first member provided with a series of inclined surfaces, a second member having a cylindrical surface, one of the members encircling the other, a plurality of rollers interposed between said members, each roller engaging the cylindrical surface and engaging one of said inclined surfaces, a pair of roller retainer rings fixed to said first member, each retainer ring having a circumferentially extending groove, the rollers extending axially between said retainer rings, each roller having an integral trunnion projecting from each end thereof and extending into the said grooves, a plurality of outwardly extending slots in each of said retainer rings communicating with said grooves, the slots being sufficiently wide to permit passage of the roller trunnions therethrough, each retainer ring having a recess adjacent each of said slots intersecting the outer periphery of the ring, a shoe to engage each of said rollers, the ends of the shoe being received in opposed recesses in said retainer rings, and a leaf spring associated with each of said shoes for moving each roller circumferentially along said inclined surfaces, each leaf spring and associated shoe being radially insertable as a unit inwardly into the opposed recesses.

2. In an overrunning clutch assembly, the combination of: an inner member provided with a series of inclined surfaces on its periphery, an outer member encircling the inner member and having a cylindrical bore, a plurality of rollers interposed between said members, each roller engaging the cylindrical bore and engaging one of said inclined surfaces, a pair of roller retainer rings fixed to said inner member, each retainer ring having a circumferentially extending groove, the rollers extending axially between said retainer rings, each roller having an integral trunnion projecting from each end thereof and extending into the said groove, a plurality of outwardly extending slots in each of said retainer rings communicating with said grooves, the slots being sufficiently wide to permit radial passage of the roller trunnions therethrough, each retainer ring having a recess adjacent each of said slots intersecting the outer periphery of the ring, a shoe to engage each of said rollers, the ends of the shoe being received in opposed recesses in said retainer rings, and a leaf spring associated with each of said shoes for moving each roller circumferentially along said inclined surfaces, each leaf spring and associated shoe being radially insertable as a unit inwardly into the opposed recesses.

3. In an overrunning clutch assembly, the combination of: a first member provided with a series of inclined surfaces, a second member having cylindrical surface, one of the members encircling the other, a plurality of rollers interposed between said members, each roller engaging the cylindrical surface and engaging one of said inclined surfaces, a pair of roller retainer rings fixed to said first member, each retainer ring have a circumferentially extending groove, the rollers extending axially between said retainer rings, each roller having an integral trunnion projecting from each end thereof and extending into the said groove, a plurality of radial slots in each of said retainer rings intersecting said grooves, the slots being sufficiently wide to permit radial passage of the roller trunnions therethrough, each retainer ring having a radially extending recess adjacent each of said slots intersecting the outer periphery of the ring, a shoe to engage each of said rollers, the ends of the shoe being received in opposed recesses in said retainer rings, and a leaf spring associated with each of said shoes for moving each roller circumferentially along said inclined surfaces, each leaf spring and associated shoe being radially insertable as a unit inwardly into the opposed recesses.

4. In an overrunning clutch assembly, the combination of: a first member provided with a series of inclined surfaces, a second member having a cylindrical surface, one of the members encircling the other, a plurality of rollers interposed between said members, each roller engaging the cylindrical surface and engaging one of said inclined surfaces, a pair of roller retainer rings fixed to said first member, each retainer ring having a circumferentially extending groove, the rollers extending axially between said retainer rings, each roller having an integral trunnion projecting from each end thereof and extending into the said grooves, a plurality of outwardly extending slots in each of said retainer rings communicating with said grooves, the slots being sufficiently wide to permit passage of the roller trunnions therethrough, each retainer ring having a recess adjacent each of said slots intersecting the outer periphery of the ring, a shoe to engage each of said rollers, the ends of the shoe being received in opposed recesses in said retainer rings, a leaf spring associated with each of said shoes for moving each roller circumferentially along said inclined surfaces, each leaf spring and associated shoe being radially insertable as a unit inwardly into the opposed recesses, and means in each recess engaging the ends of the leaf spring to prevent outward radial movement thereof.

5. In an overrunning clutch assembly the combination of: an inner member, an outer member encircling the inner member, one of the members being provided with a series of inclined surfaces, a plurality of rollers interposed between said members, each roller engaging one of said inclined surfaces, a pair of retainer rings fixed to the member having the inclined surfaces, the rollers extending axially between said retainer rings, each retainer ring having a series of circumferentially spaced radially extending recesses intersecting the outer periphery of the ring, a shoe to engage each of said rollers, the ends of the shoe being received in opposed recesses in said retainer rings, each shoe having a flange along one edge thereof, a leaf spring engaging each of said shoes radially outwardly of the flange for moving each roller circumferentially along said inclined surfaces, each leaf spring and associated shoe being insertable radially as a unit inwardly into the opposed recesses in the absence of the other member, and means in each recess engaging the ends of the leaf spring to prevent outward movement thereof.

References Cited in the file of this patent

UNITED STATES PATENTS

| | | |
|---|---|---|
| 549,377 | Ljungstrom | Nov. 5, 1895 |
| 879,993 | Wilson | Feb. 25, 1908 |
| 1,583,530 | De Lavaud | May 4, 1926 |
| 1,942,909 | Von Thungen | Jan. 9, 1934 |
| 2,064,230 | Starr | Dec. 15, 1936 |
| 2,203,805 | Wiggs | June 11, 1940 |
| 2,371,653 | Schuckers | Mar. 20, 1945 |

FOREIGN PATENTS

| | | |
|---|---|---|
| 368,693 | Sweden | Sept. 4, 1930 |